US012695620B2

(12) United States Patent　　　　(10) Patent No.: US 12,695,620 B2
Sekniqi et al.　　　　　　　　　　　(45) Date of Patent: Jul. 28, 2026

(54) NON-TRANSFERABLE TOKEN

(71) Applicant: AVA LABS, INC., New York, NY (US)

(72) Inventors: Kevin Sekniqi, New York, NY (US);
Emin Gün Sirer, New York, NY (US);
Patrick Robert O'Grady, New York,
NY (US)

(73) Assignee: AVA LABS, INC., New York, NY (US)

( * ) Notice: Subject to any disclaimer, the term of this
patent is extended or adjusted under 35
U.S.C. 154(b) by 114 days.

(21) Appl. No.: 18/701,460

(22) PCT Filed: Oct. 19, 2022

(86) PCT No.: PCT/US2022/047116
§ 371 (c)(1),
(2) Date: Apr. 15, 2024

(87) PCT Pub. No.: WO2023/069505
PCT Pub. Date: Apr. 27, 2023

(65) Prior Publication Data
US 2024/0422011 A1　　　Dec. 19, 2024

Related U.S. Application Data

(60) Provisional application No. 63/257,475, filed on Oct.
19, 2021.

(51) Int. Cl.
*H04L 9/32* (2006.01)
*H04L 9/00* (2022.01)

(52) U.S. Cl.
CPC .......... *H04L 9/3247* (2013.01); *H04L 9/3218*
(2013.01); *H04L 9/50* (2022.05)

(58) Field of Classification Search
None
See application file for complete search history.

(56) References Cited

U.S. PATENT DOCUMENTS 7,222,362 B1 * 5/2007 Canetti ................. H04L 9/0869
726/5
2021/0192520 A1 * 6/2021 Patel ...................... G06Q 20/02
2022/0327225 A1 * 10/2022 Lyren .................... G06F 21/125

FOREIGN PATENT DOCUMENTS

WO　　2011/084117 A1　　7/2011
WO　　2018/132552 A1　　7/2018
WO　　2020/142772 A1　　7/2020

OTHER PUBLICATIONS

Shen, J., Ning, J., Feng, Q., He, D. and Huang, X., 2026. Non-
Transferable Anonymous Tokens with Decentralized Issuance by
Blind Multisignatures. IEEE Transactions on Information Forensics
and Security. (Year: 2026).*

(Continued)

*Primary Examiner* — Luu T Pham
*Assistant Examiner* — Edward X Long
(74) *Attorney, Agent, or Firm* — McDermott Will &
Schulte LLP

(57)　　　　　　ABSTRACT

Various aspects of the subject technology relate to systems,
methods, and machine-readable media for providing a digi-
tal credential. Various aspects may include receiving a
request for execution of a transaction on a blockchain.
Aspects may also include identifying a party that originated
the request. Aspects may also include selecting an issuer of
a non-transferable credential stored on the blockchain.
Aspects may also include requesting receipt of the non-
transferable credential from the party. Aspects may include
performing a credential check based on a digitally signed
statement comprising key pairs of the non-transferable cre-
dential.

20 Claims, 8 Drawing Sheets

(56)                         References Cited

OTHER PUBLICATIONS

Zaman, N., Aksakalli, I.K. and Bayn, N., 2023. Digital Certificate Security: A Blockchain-based Approach for Fraud Prevention and Verification. Bitlis Eren Üniversitesi Fen Bilimleri Dergisi, 12(4), pp. 1128-1138. (Year: 2023).*
International Search Report and Written Opinion for International App. No. PCT/US2022/047116, mailed Mar. 22, 2023 (11 pages).

* cited by examiner

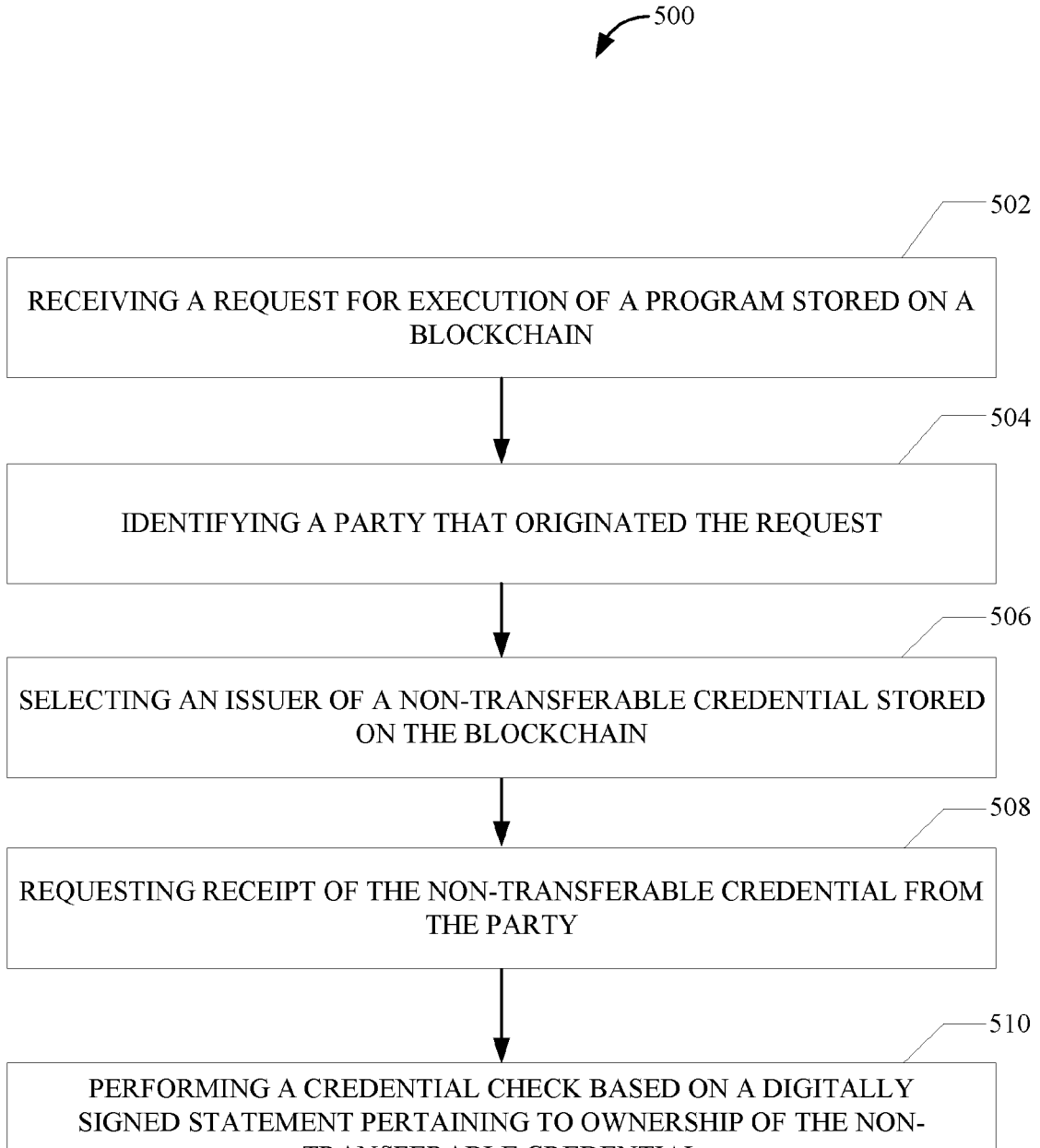

500

502

RECEIVING A REQUEST FOR EXECUTION OF A PROGRAM STORED ON A BLOCKCHAIN

504

IDENTIFYING A PARTY THAT ORIGINATED THE REQUEST

506

SELECTING AN ISSUER OF A NON-TRANSFERABLE CREDENTIAL STORED ON THE BLOCKCHAIN

508

REQUESTING RECEIPT OF THE NON-TRANSFERABLE CREDENTIAL FROM THE PARTY

510

PERFORMING A CREDENTIAL CHECK BASED ON A DIGITALLY SIGNED STATEMENT PERTAINING TO OWNERSHIP OF THE NON-TRANSFERABLE CREDENTIAL

FIG. 5

NON-TRANSFERABLE TOKEN

CROSS REFERENCE TO RELATED APPLICATIONS

The present disclosure is related to and claims priority under 35 USC § 1.119 (e) to U.S. Provisional Patent Application No. 63/257,475, entitled NON-TRANSFER-ABLE TOKEN, filed on Oct. 19, 2021, the contents of which are incorporated herein by reference, in their entirety, and for all purposes.

TECHNICAL FIELD

The present disclosure generally relates to assets and transactions implemented via blockchains, and more particularly to blockchain exchanges (e.g., cryptocurrency exchanges) that require credential verification based on non-movable digital credentials.

BACKGROUND

Blockchain transactions require identity verification that is performed in a native manner to the blockchain. That is, certain blockchain transactions should not use interactive identity verification because blockchains cannot handle identify verification requiring an external third-party application programming interface (API) call. Thus, verification credentials on the blockchain can avoid interactive identity verification. In particular, a non-transferable token stored on the blockchain can be used for non-interactive identity verification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 5 is an example flow diagram for generating a non-transferable blockchain security credential via a computing platform, according to certain aspects of the present disclosure.

Figure 1:
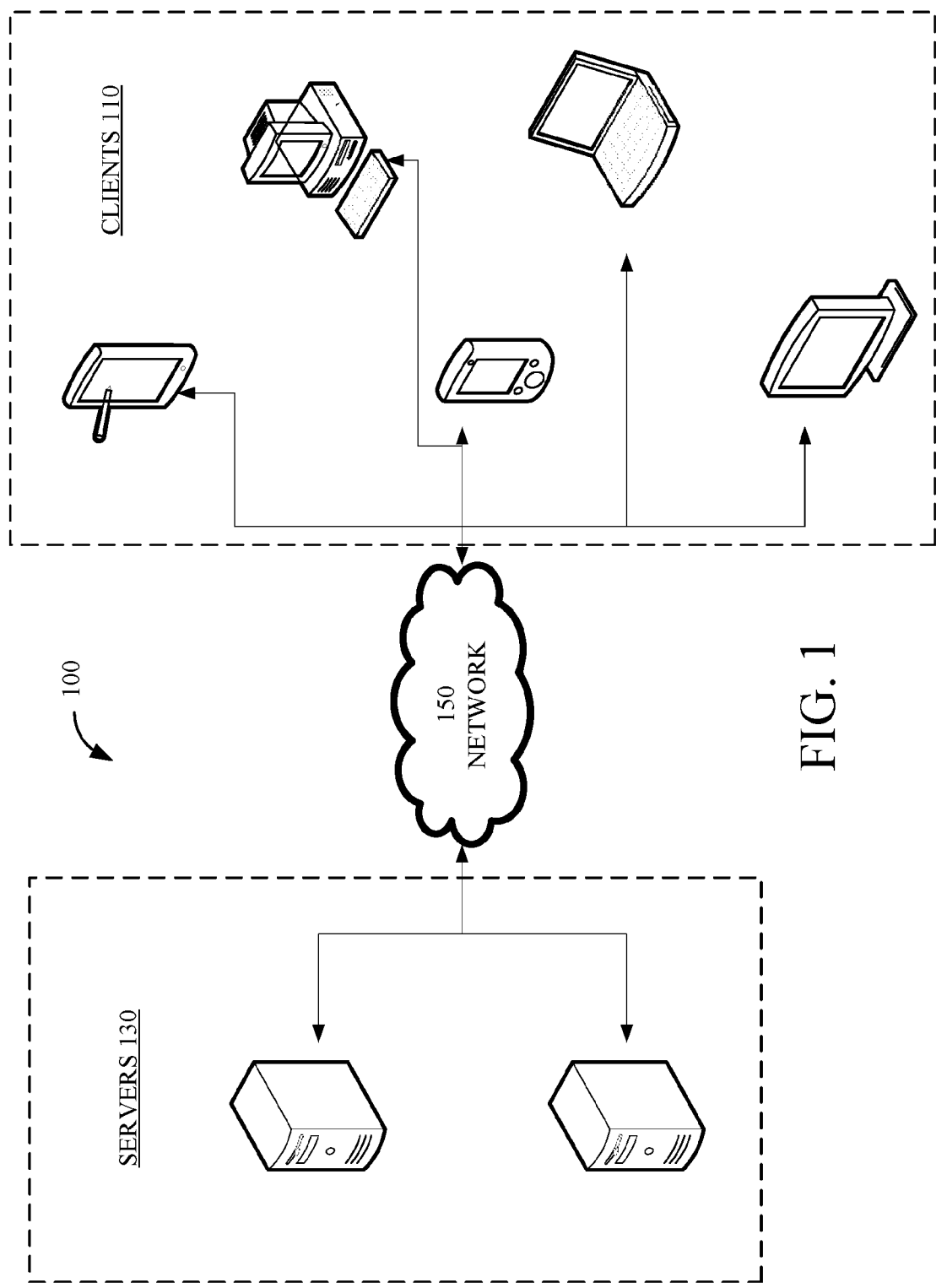
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure. In the figures, elements having the same or similar reference numerals, are associated with the same or similar attributes, unless explicitly said otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the included clauses. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art, that embodiments of the present disclosure may be practiced without some of the specific details. In other instances, well-known structures and techniques have not been shown in detail so as not to obscure the disclosure.

Blockchain transactions can be conducted over a centralized exchange or a decentralized exchange. It may be beneficial to verify the identity of transactions, similar to the application of know your customer (KYC) verification checks in general financial transactions. Blockchain assets can include programs (e.g., smart contracts) for financial transactions or other programs using code on the blockchain for other functions. Non-transferable tokens (NTT) may advantageously provide a mechanism for global verification of parties in transactions. The NTT is an asset that is associated with an address on the blockchain. In some embodiments, an NTT may optionally include additional credentials as well as encrypted or encoded data payloads. Moreover, the NTT may verify identities of parties with non-interactive proofs of identity (e.g., in a smart contract or any other asset transaction). Being non-interactive may be advantageous because certain blockchain implementations may be incapable of executing external third party application programming interface (API) calls for request information required for performing interactive proofs of identity. The NTT may be used for identify verification prior to requested execution or function call invocations of blockchain transactions (e.g., swap function) for permitting execution upon properly verifying identity based on the NTT assigned to a requesting blockchain address. As an example, the NTT verification may be performed by a centralized exchange or through an augmented function call that has a NTT verification pre-requisite. In particular, blockchain transactions interacting with the NTT can check the signature associated with the issuers of the NTT.

NTTs may be an advantageous means to verify the identity of parties for blockchain platforms that operate in an open source manner (e.g., any participant in the platforms can develop any application). NTTs may also be used for assessing accredited investor status relative to the blockchain platforms. Blockchain transactions may involve, for example, releasing funds to appropriate parties, registering a vehicle, sending notifications, issuing a ticket for an event, allowing a contract employee access to specific buildings or areas within a building, verifying identity of third parties, and the like. A corresponding public blockchain is then updated when the transaction is completed and cannot be changed. Consequently, it can be beneficial for security mechanisms and verification to be implemented, such as via NTTs. Assets (e.g., smart contracts, cryptocurrency, and the like) stored on the public blockchain should limit parties who are able to interact with blockchain assets. However, transactions running on the public blockchain may be challenging to prevent user accounts from interacting with or causing execution of functions defined on the blockchain. As such, blockchain transactions may require proof of identity that is implemented in a way that is native to the blockchain. In some embodiments, blockchain platforms support deterministic execution. Accordingly, all nodes may be able to execute the same code with the same result. Because exterior calls cannot be verified by the blockchain system to be deterministic they are usually not allowed in the blockchain. Thus, blockchain platforms may not make external API calls. In some embodiments, a blockchain may allow external API calls including certain validity checks, as disclosed herein.

The NTTs of the present disclosure can function as proof of identity without requiring an external API call that the blockchain may be incapable of performing. A validity check as disclosed herein may include a signature check, checking of the data payload, and/or zero knowledge proof of possession of an NTT. In particular, NTTs or a signature verification associated with the NTTs may be required before permitting a particular user account or blockchain address to interact with particular assets. The signature verification may be based on a public-private key cryptographic (e.g., security) verification or a zero-knowledge proof. As an example, an NTT holder may use a digitally signed statement (e.g., attribute values pairs) from the NTT issuer or a proof based on the NTT credential to complete a credential check without disclosing sensitive personal information. As discussed herein, issuers of NTTs may conduct robust security verification of user identity and other relevant information prior to issuing an NTT to a particular public blockchain address controlled by a corresponding user whose identity is being verified.

FIG. 1 is a block diagram of a device operating environment with which aspects of the present disclosure can be implemented. In the devices illustrated in FIG. 1, there is no hard distinction between servers 130 and clients 110. For example, servers 130 run a code that implements one blockchain, and any one of client devices 110 (e.g., mobile phones, laptops, palm devices or desktops) can execute that code to qualify, at least temporarily, as a server hosting the blockchain. FIG. 1 illustrates an exemplary network architecture 100 to provide a blockchain credential platform for outputting filtered visual media content items, according to some embodiments. The network architecture of FIG. 1 includes one or more client devices 110 and one or more servers 130 which are communicatively coupled through the network 150. The network 150 may include a wired network (e.g., via fiber optic or copper wire, telephone lines, and the like) or wireless network (e.g., a cellular network, radio-frequency (RF) network, Wi-Fi, Bluetooth, and the like). The client devices 110 may be any one of a mobile device, a laptop, a desktop, a tablet (e.g., palm or pad) device, a television, a display device, and/or the like. The client devices 110 can be controlled by a user to perform transactions via the blockchain platform with non-interactive identity verification, such as via the mechanisms described herein. Multiple client devices 110 may have access to the blockchain platform hosted by the servers 130 via an online or offline connection, such as a wireless connection, wired connection, ad hoc connection, mobile connection, satellite connection, and/or the like. Servers 130 may also be running, at least temporarily, on light or mobile devices such as smartphones, and the like. Each of the servers 130 may be a computing device such as part of a cloud computing server including one or more desktop computers or panels mounted on racks, and/or the like. The panels may include processing boards and also switchboards, routers, and other network devices.

Figure 2:
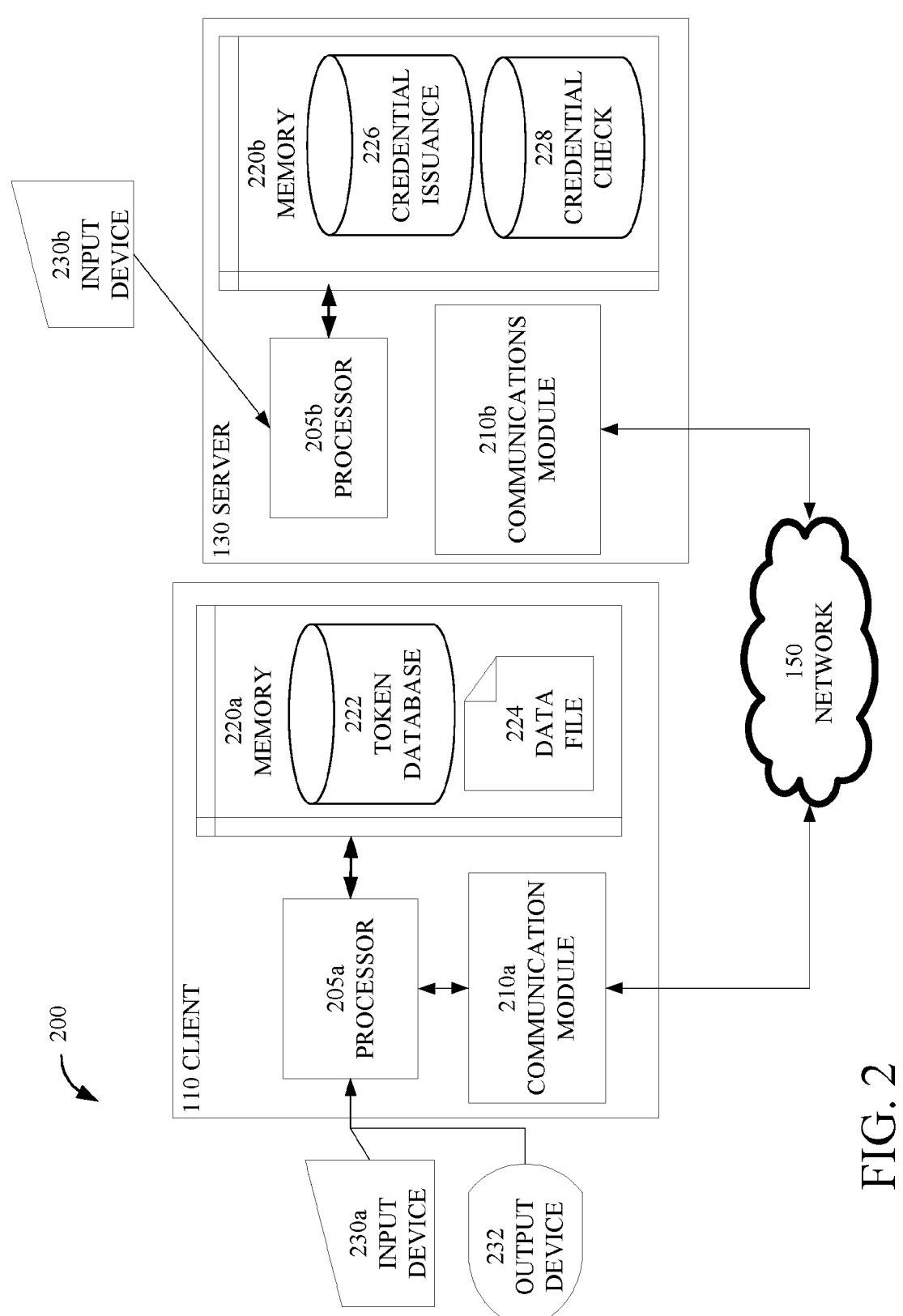
FIG. 2 is a block diagram of an example computing network of an example blockchain based platform for generating a non-transferable security credential, according to certain aspects of the present disclosure.

FIG. 2 is a block diagram of an example computing network 200 of an example content platform for performing a blockchain based identity verification, according to certain aspects of the present disclosure. The identity verification can be based on a non-interactive non-transferable token, which can be advantageous for blockchain transactions that effectively operate on one collective operating system. That is, the blockchain transactions are not configured to interact with external or remote APIs, such that they cannot query an external in API call for identity verification. FIG. 2 illustrates a client device (of one or more client devices) 110 and a server (of one or more servers) 130 of the example computing network 200 for use in the network architecture of FIG. 1, according to some embodiments. The identity verification can be used to verify that the user of the client device 110 is actually who the user represents they are and/or the user is not a restricted user (e.g., such as a citizen of a limited jurisdiction). As such, it may be beneficial for the blockchain to verify identity based on a non-interactive type of identity tag (e.g., can be visualized as the user of the client device 110 holding a yellow card, red card, etc.) owned by an address corresponding to the client device 110. In other words, the identity tag can be represented as a non-transferable token (NTT) that is assigned or granted to a public address on the blockchain. The identity tag can be shown as a proof of ownership relative to the public address on the blockchain.

Each of the one or more client devices 110 and the one or more servers 130 may access each other and other devices in the network 150 via corresponding communications modules 210a-210b. The communications modules 210a-210b may each include radio hardware and software such as RF antennas, analog circuitry, digital to analog conversion circuits, digital signal processing circuitry, and/or the like. The client device 110 and server 130 depicted in FIGS. 1-2 may each include a processor 205a-205b and memory 220a-220b, respectively. The processor 205a of the client device 110 may be used to operate the client device 110, such as to execute applications and functions thereof rendered on the client device 110. The processor 205b of the server 130 may be used to perform blockchain based identity verification. In some embodiments, NTT issuance is performed by a third party, and server 130 processes and records the NTT issuance transaction. The server 130 can correspond to a credential issuer, which can function as a certified authority for generating digital credentials on the blockchain. As an example, the server 130 may mint a new card (e.g., NTT, digital credential) on the block chain based on receiving a blockchain asset address (e.g., cryptocurrency account address, smart contract address, and the like) from one or more clients. In this way, the created NTT is a token recorded as a NTT record that is owned on the blockchain address input via the corresponding client and/or user. That is, the NTT or credential can be associated, withheld by, or owned on the blockchain address. The blockchain address of the corresponding client device 110 can store other blockchain tokens (e.g., licenses, votes, cryptocurrency) encoded in an asset.

Generally, the client device 110 and the server 130 comprise computing devices including at least: the memory 220a-220b storing instructions and processors 205a-205b configured to execute the instructions to perform, at least partially, one or more steps as described in methods disclosed herein. For example, the memory 220a of the client device 110 may be used to gain access to a browser, application, or device component corresponding to the blockchain platform hosted by the server 130. Settings of the server 130 can be defined via user/operator input, such as via an input device 230b. The client device 110 may be used by a user of the blockchain platform, such as to perform blockchain transactions, such as via a graphical user interface (GUI) screen rendered on the client device 110. For example, the client device 110 may be coupled to at least one input device 230a and output device 232 accessible by the user (e.g., for user input and output perceivable by the user). The input device 230a can include a mouse, keyboard, a pointer, a stylus, a touchscreen display, microphone, voice recognition software, graphical user interface (GUI), and/or the like. The output device 232 can include a display (e.g., the same touchscreen display as the input device), a speaker, an alarm, and the like.

Advantageously, the blockchain based identity verification may not require the user of the client device 110 to provide personal details (e.g., personal name, physical geographical address, etc.). Because the NTT is a digital asset that cannot be moved or transferred by the owner of the public address on the blockchain, identity verification can be performed by an entity such as by an exchange knowing that the NTT cannot have been received by the user of the client device 110 from another third party. The identity verification can be used to enable verified users/client devices 110 to perform certain actions that are not available to unverified people, such as to purchase certain items or perform certain cryptocurrency based transactions. Additionally or alternatively, the NTT can be implemented as a digital credential that is implanted by a limited move facility such that the NTT is transferable in a strictly limited manner for certain purposes (e.g., verified transition if NTT is inherited from the owner of the NTT and/or the like). The NTT can function similarly to a non-fungible token (NFT). In particular, the NTT can be a unique token that is not sub dividable into a smaller unit. That is, one NTT cannot be divided into smaller than one token and is unique such that there cannot be another instance of the same NTT.

The NTT can be in a database 222 of the client device 110 that stores tokens. The input device 230a can be used to access the stored tokens on the client, such as to perform a transaction including token exchange, swap, etc. A data file 224 can be used by the credential issuer to perform the blockchain based identity verification. The data file 224 stored in the memory 220a can include application settings, files, and data specific to the associated user of the client device 110. The credential identifier can correspond to the server 130 which can include memory 220b including databases 226, 228 that store information for issuing the NTT digital credential and/or performing a credential check for a particular blockchain address and/or client device 110 for the identity verification. During a requested interaction with a blockchain asset or transaction, the NTT stored on the address corresponding to the blockchain asset can be checked for accuracy to enable swapping, function calls (e.g., blockchain function), or other desired interactions with the blockchain. Swapping can refer to swapping a source token for a destination token. Thus, a credential check does not require interactivity (e.g., no third-party API calls are required). Interaction with the owner of the NTT may only be required when the NTT is initially issued and stored on the owner's address on the blockchain.

The server 130 issuing the NTT can be any suitable certified credential issuing authority, such as an authority that performs KYC, a centralized exchange, decentralized exchange and/or the like. The developer of a particular blockchain asset can select an NTT from any suitable group of credential issuers so that when another party requests to interact with the particular blockchain asset, the other party may be subject to a credential check. That is, the other party will need to prove possession of a correct NTT prior to being permitted to interact with the particular blockchain asset. The credential check may involve checking a digitally signed statement comprising attribute value pairs (e.g., corresponding to key pair such as public-private key for encryption) to verify the NTT stored on the blockchain address produced by the other party. In this way, a signature corresponding to the public address of the credential issuing authority can be encoded into the particular blockchain asset such that it can be verified whether the NTT is issued by the correct credential issuing authority.

In particular, the blockchain asset that interacts with the NTT can check the signature associated with the issuer of the NTT to verify that NTT (e.g., based on the public-private key held by the NTT issuer that is not shared with the public and/or signature check of public-private key of certificate authority/NTT issuer) is authorized and verified. In other words, the digital signature of the NTT can be checked for verification and authenticity because a party cannot replicate the digital signature without the private key held by the NTT issuer. Because the NTT is non-interactive, a blockchain exchange advantageously can permit actions (e.g., blockchain transactions) such as depositing cryptocurrency or other tokens based on verifying the NTT without requiring personal information of the other party. The exchange can implement a rule such as an augmented function call of the particular blockchain asset so that no operation can be performed unless the sender of the function call is from an address storing the verified NTT.

Issuance of an NTT to a given address on the blockchain may require performance of a rigorous security check of an NTT applicant. For example, the credential authority can check for details such as accredited legal name, social security number, tax identification, passport information, accredited investor status, and/or the like. Moreover, the credential authority can have the power to revoke the NTT or set an expiration or time out parameter at which point the NTT expires. In some embodiments, an NTT may be a credential that is issued to someone who carries out an action on a website, someone who reached a certain level in a game, and the like.

Although the above description describes certain functions being performed by the processor 205a of the client device 110 and other certain functions being performed by the processor 205b of the server 130, all of the functions described herein can be performed by the client device 110 and/or the server 130 in some other alternative division of labor. That is, the processors 205a, 205b could perform more or less of the functions (e.g., portions of the machine learning algorithm and/or image processing) described above. In some embodiments, some or part of the client device 110 can be co-located with the server 130. That is, the server 130 can be remote from or both the client device 110 and the server 130 can be part of the same larger computing system, network, or architecture.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
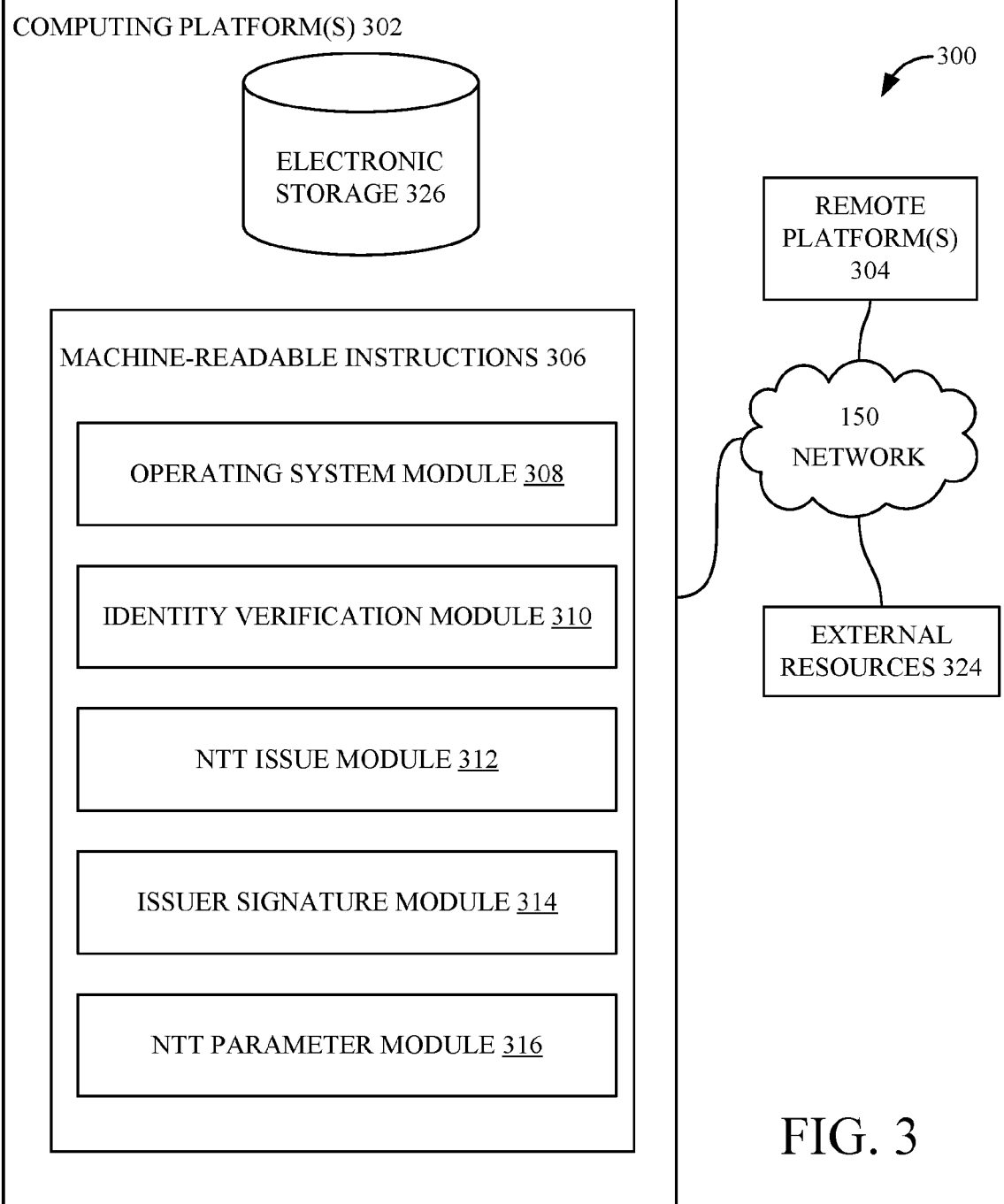
FIG. 3 is a block diagram illustrating an example computer system (e.g., representing both client and server) with which aspects of the subject technology can be implemented.

FIG. 3 is a block diagram illustrating an example computer system 300 (e.g., representing both client and server) with which aspects of the subject technology can be implemented. The system 300 may be configured for providing a digital credential, according to certain aspects of the disclosure. In some implementations, the system 300 may include one or more computing platforms 302. The computing platform(s) 302 can correspond to a server component of a blockchain platform, which can be similar to or the same as the server computing device(s) 130 of FIG. 3 and include the client computing device(s) 110 of FIG. 1. The computing platform(s) 302 can be configured to store, determine, send, receive, and/or analyze blockchain transactions and/or digital credentials (e.g., NTTs) to better safeguard the use of applications on a public blockchain system (e.g., computer system 300). In particular, the computing platform(s) 302 (e.g., as an exchange or lending market) can provide protections and regulations such that applications including blockchain transactions can limit what parties or developers are interacting with them, such as based on NTT identity verification of the provided protections and regulations.

The computing platform(s) 302 may be configured to communicate with one or more remote platforms 304 according to a client/server architecture, a peer-to-peer architecture, and/or other architectures. The remote platform(s) 304 may be configured to communicate with other remote platforms via computing platform(s) 302 and/or according to a client/server architecture, a peer-to-peer architecture, and/or other architectures. Because transactions on the public blockchain may be limited to native applications within its own operating system, the computing platform(s) 302 may address this limitation with a non-interactive credential for proof of identity. That is, credentials such as NTTs can be stored on the blockchain of the system 300 as non-movable or limited move digital assets. In this way, the remote platform(s) 304 can interact with the computing platform(s) 302 and transactions thereof, upon providing a digital identification based on a corresponding. As an example, the remote platform(s) 304 can provide a digitally signed statement, a zero-knowledge proof, a digital identification card based on the NTT, and/or the like as identity verification prior to be permitted to interact with blockchain assets. The computing platform(s) 302, external resources 324, and remote platform(s) 304 may be in communication and/or mutually accessible via the network 150.

The computing platform(s) 302 may be configured by machine-readable instructions 306. The machine-readable instructions 306 may be executed by the computing platform(s) to implement one or more instruction modules. The instruction modules may include computer program modules. The instruction modules being implemented may include one or more of operating system module 308, identity verification module 310, NTT issue module 312, issuer signature module 314, NTT parameter module 316, and/or other instruction modules.

The operating system module 308 can execute a public or shared operating system that implements a public blockchain, for example. The operating system module 308 may host the public operating system that various users can install applications in. Such installed applications can be in communication and operate in coordinated manners, such as to perform cryptocurrency transactions such as swaps, borrowing, lending, etc. Individually developed applications can be included in the one public operating system of the operating system module 308. The blockchain may provide public addresses for storage of the NTTs or other digital credential. An owner of a particular public address cannot move or transfer the NTT stored on the corresponding public address, unless a limited move facility is available. For example, the limited move facility may enable the NTT to be transferred a certain quantity of instances, such as a limited number of times. The value of the limited move facility can set as zero as a default such that NTTs are immovable by default. However, as an example, the issuer of the NTT could set the value as greater than zero to authorize a limited quantity of transfers. Such transfers can be monitored by the NTT issuer to ensure that the transferor and transferee of the NTT become authenticated and identity verified prior to performing the transfer. As such, users may be authenticated and pay a fee prior to invoking a function call or interact with some other blockchain function on the from other developers.

The identity verification module 310 may perform a signature check. The identity verification module 310 may perform the signature check based on receiving an issued and authorized NTT from a party desiring to interact with an asset on the public blockchain. As an example, the blockchain asset that interacts with the NTT subject to the credential check can verify that the NTT can generate a valid digitally signed statement (e.g., including data and signature) or signature. For example, the NTT can be a credential "card" indicative of or associated with a signature of the NTT issuer. The signature check may involve the blockchain asset checking the public-private key that signs the proffered NTT. If the public-private key of the NTT matches a private key that the NTT issuer keeps confidential and uses to generate signatures, then the blockchain asset can verify that the NTT is legitimate via the signature check. The NTT credentials can comprise attribute value pairs pertaining to the NTT issuer or user (e.g., Name=Diego, Last Name=Maradona, Location=CA, Country=US). The signature check may be more secure in the scenario that a malicious actor improperly replicates the NTT but is unable to replicate the securely held confidential private key signature of the NTT issuer. As such, the signature check may prevent the malicious actor from improperly issuing themselves the NTT, since they do not have the private key.

The identity verification module 310 can also verify identity via the NTT similarly to analyzing NFTs for unique identification codes and metadata. As an example, a given NTT provided by the remote platform(s) 304 for identity verification can cause display of a picture, which can function as a digital identification card. The picture can indicate the function and nature of the NTT credential, such as citizenship, authorized financial transactions, etc. for the NTT holder. The NTT based verification performed by the identity verification module 310 advantageously may be non-interactive so that the subject blockchain asset or transaction does not have to query an external API call to an identity provider since blockchain assets do not have such a capability. In some embodiments, an NTT as disclosed herein has an associated image for user interface purposes. For example, an American flag may be used for NTTs that refer to or identify US citizens, people or businesses who reside in the US, and the like. In this way, the computing platform(s) 302 may receive an image representation that indicates a characteristic of the NTT, such as the function and nature of the NTT credential. The NTT may function as a contract that exists on the blockchain to verify the NTT holder's identity without revealing sensitive personal information. Since the NTT can be held on the NTT holder's blockchain address, assets on the blockchain can verify whether the digital identification (e.g., similar to an identification tag) of the NTT is accurate as part of a KYC type identification/credential check before authorizing cryptocurrency financial transactions with the blockchain.

Regardless of the method of credential checking, the identity verification module 310 can maintain the privacy of personal information when checking a proffered subject NTT. For example, the identity verification module 310 may use a zero-knowledge proof to securely verify the holder of the subject NTT without revealing sensitive personal information. A user of the blockchain holding the subject NTT can use a client program that generates a binary value for performing a credential check of the holder. For example, the credential check can verify that the subject NTT holder is over the age of 18 without revealing sensitive personal information such as the holder's actual date of birth. The NTT holder or owner may also generate a different type of identity verification such as a proof of ownership which is distinct from the blockchain or blockchain based verification. As an example, a critical number of crypto signatures can be used as a threshold before the proof of ownership is generated. As an example, a quorum attestation from multiple NTT certificate authorities may be used to determine the NTT holder truly possesses the credential (e.g., controls the address having or stores the NTT). The quorum attestation may be based on a chain oracle configured to check credential status at a particular moment in time (e.g., at the time when the check is being performed). The chain oracle may connect blockchain assets to external systems to enable transactions (e.g., smart contracts) to execute based on an external systems quorum attestation. For example, a plurality of certificate authorities or NTT issuers (e.g., in a N-factor authentication) can verify that the NTT owner correctly provided authentic cryptographic information/identifiers associated with the subject NTT.

In this way, the identity verification module 310 may verify that the requesting party that originated a request for execution of a program stored on the blockchain has their identity verified, such as based on being a legitimate NTT holder. As discussed herein, the attribute/value pair is indicative of the NTT holder possessing a public-private key that uniquely identifies the NTT issuer that issued the NTT to requesting party may be used to authenticate the requesting party. The public-private key of the pair is distributed publicly while the private key can be used to cryptographically sign the digitally signed statement. A special function can be invoked with the public-private key by the identity verification module 310 to determine whether the NTT issuer truly did or did not make the statement. For example, the function returns a binary "1" if the statement is true or a binary "0" if the statement is false. As an example, the blockchain asset being requested by the requesting party may have the address of the NTT issuer such that the requesting party is verified to have an NTT on the blockchain that is coming from the correct public/private key pair encoded onto the blockchain asset. The identity verification module 310 can also be configured to set an expiration time and/or to revoke the issued NTT based on settings agreed to by the NTT issuer and the requesting party. As discussed herein, the identity verification module 310 beneficially does not need any external action by the requesting party nor receive any sensitive personal information of the requesting party for authentication. Thus, the requesting party can be authenticated without disclosing significant confidential information, such as using a non-interactive secure link protocol.

The NTT issue module 312 may be used to issue a non-transferable digital credential such as a non-movable digital asset or NTT. The NTT issue module 312 can grant the NTT to a public address on the blockchain implemented by code in operating system module 308. The owner of the public address can be restricted from moving or transferring the NTT, although a limited number of supervised transfers could be based on a limited move facility that is set to a value greater than zero. The NTT issue module 312 can include multiple disparate NTT credential issuers. Pluralities of blockchain users may accept NTTs from the multiple disparate NTT credential issuers. That is, a user that desires an NTT credential may select which NTT issuers that they trust. In other words, users may locally select the NTT issuer that they use rather than have a globally imposed NTT issuer. A blockchain based exchange such as a cryptocurrency exchange platform may designate certain NTT issuers and use the identity verification module 310 to perform credential/identification checks corresponding to the designated NTT issuers. In this way, the cryptocurrency exchange platform can regulate or limit who is interacting with blockchain assets on the platform, such as limiting who can interact with cryptocurrency swap functions based on who is a proper holder of an authenticated NTT. The cryptocurrency exchange may be centralized or decentralized. Each of the NTT providers can be part of a market of certificate authorities. Under this system, exchanged platforms can use the expertise of NTT providers for identity verification as trusted digital credential issuers.

The issuer signature module 314 can generate a signature for an issuer of the NTT. The signature can only be replicated by the NTT issuer, such as based on a public/private key cryptographic system. The blockchain encodes in an asset type and issuer for an NTT. NTTs can be identified by an asset identifier. Accordingly, an NTT as disclosed herein ensures that only selected issuers can issue a given blockchain asset. In particular, a public-private key address pair can be verified to be correct to properly determine that the corresponding blockchain asset has the public address of the NTT issuer encoded, which establishes that the corresponding NTT is issued by the correct issuer. The NTT issuer can issue the NTT in an NFT format or as a fungible token (e.g., a non-transferable, non unique ticket). For example, the NTT issuer may issue classes or categories of NTTs. Each class or category of NTT can be used for a particular type of verification, such as age verification, citizenship verification, financial verification, and/or the like. As such, a particular class of NTT may correspond to a particular type of identity verification or credential check, such as for a particular type of transaction call, cryptocurrency function, etc. Each class or category of NTT may comprise a plurality of non-unique instances. That is, instances within a given class or category are not distinguishable. A holder of any of multiple instances can be verified as an NTT credential holder within the relevant credential class or category.

The NTT parameter module 316 can determine or set values for NTT characteristics such as a limited quantity of verified NTT transfers. As an example, an NTT characteristic can be a certain number of authorized transfers such as via the limited move facility, in which a number at zero makes the associated NTT completely non-transferable while a number greater than zero enables a limited quantity of supervised transfers to be permissible. As an example, the NTT characteristic can be an expiration or revocation characteristic. The NTT parameter module 316 may set a time value for when the subject NTT expires. In other words, the NTT issuer can automatically invalidate the NTT as a specific time or period of time. The NTT parameter module 316 can also set, such as based on agreement terms between the NTT holder and NTT issuer, whether the NTT issuer is authorized to revoke the subject NTT in certain situations, such as in case of fraud or other malicious act. Additionally or alternatively, the NTT issuer or certified/credential authority can have revocation ability to choose to revoke a set of keys authorized by the NTT issuer at any time or under any circumstance. The NTT parameter module 316 may also determine an encryption parameter, such as the NTT being decryptable by the NTT holder. For example, the NTT issuer may issue the NTT credential in encrypted form on the public blockchain in which the NTT is decryptable only by a key (e.g., personal key) known only by the NTT holder.

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given remote platform 304 may include client computing devices, which may each include one or more processors configured to execute computer program modules. The computer program modules may be configured to enable an expert or user associated with the given remote platform 304 to interface with the system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. For example, the external resources 324 may include externally designed blockchain elements and/or applications designed by third parties.

In some implementations, some or all of the functionality attributed herein to the external resources 324 may be provided by resources included in system 300.

The computing platform(s) 302 may include the electronic storage 326, a processor such as the processors 110, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

The electronic storage 326 may comprise non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). The electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 326 may include one or more virtual storage resources (e.g., cloud storage, a virtual private network, and/or other virtual storage resources). The electronic storage 326 may store software algorithms, information determined by the processor(s) 110, information received from computing platform(s) 302, information received from the remote platform(s) 304, and/or other information that enables the computing platform(s) 302 to function as described herein.

The processor(s) 110 may be configured to provide information processing capabilities in the computing platform(s) 302. As such, the processor(s) 110 may include one or more of a digital processor, an analog processor, a digital circuit designed to process information, an analog circuit designed to process information, a state machine, and/or other mechanisms for electronically processing information. Although the processor(s) 110 is shown in FIG. 1 as a single entity, this is for illustrative purposes only. In some implementations, the processor(s) 110 may include a plurality of processing units. These processing units may be physically located within the same device, or the processor(s) 110 may represent processing functionality of a plurality of devices operating in coordination. Processor(s) 110 may be configured to execute modules 308, 310, 312, 314, 316, and/or other modules. Processor(s) 110 may be configured to execute modules 308, 310, 312, 314, 316, and/or other modules by software; hardware; firmware; some combination of software, hardware, and/or firmware; and/or other mechanisms for configuring processing capabilities on the processor(s) 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 308, 310, 312, 314, and/or 316 are illustrated in FIG. 3 as being implemented within a single processing unit, in implementations in which the processor(s) 110 includes multiple processing units, one or more of the modules 308, 310, 312, 314, and/or 316 may be implemented remotely from the other modules. The description of the functionality provided by the different modules 308, 310, 312, 314, and/or 316 described herein is for illustrative purposes, and is not intended to be limiting, as any of the modules 308, 310, 312, 314, and/or 316 may provide more or less functionality than is described. For example, one or more of the modules 308, 310, 312, 314, and/or 316 may be eliminated, and some or all of its functionality may be provided by other ones of the modules 308, 310, 312, 314, and/or 316. As another example, the processor(s) 110 may be configured to execute one or more additional modules that may perform some or all of the functionality attributed below to one of the modules 308, 310, 312, 314, and/or 316.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4A:
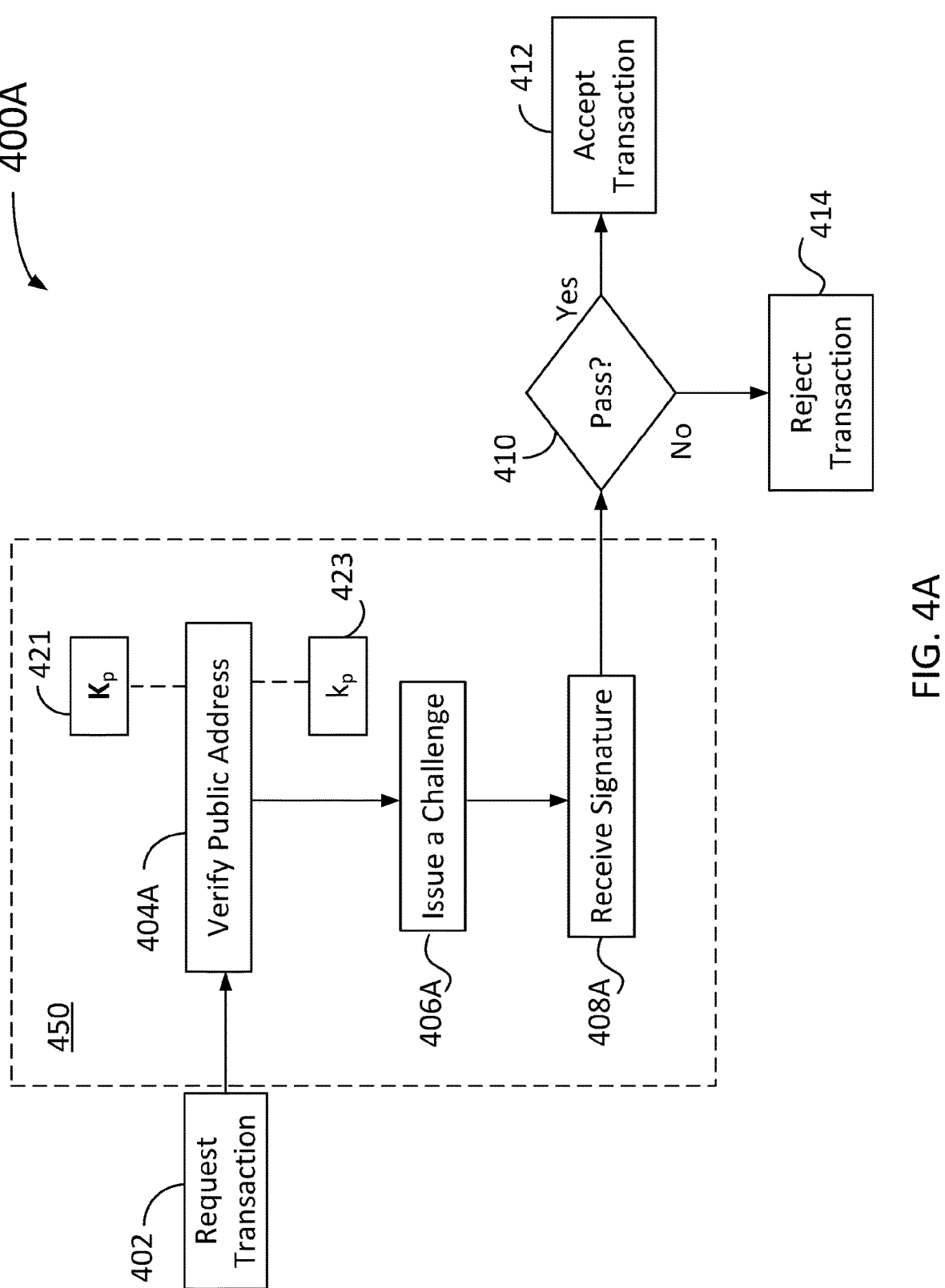
FIGS. 4A-4C illustrate exemplary flow diagrams for verifying non-transferable tokens, as disclosed herein.
Figure 4B:
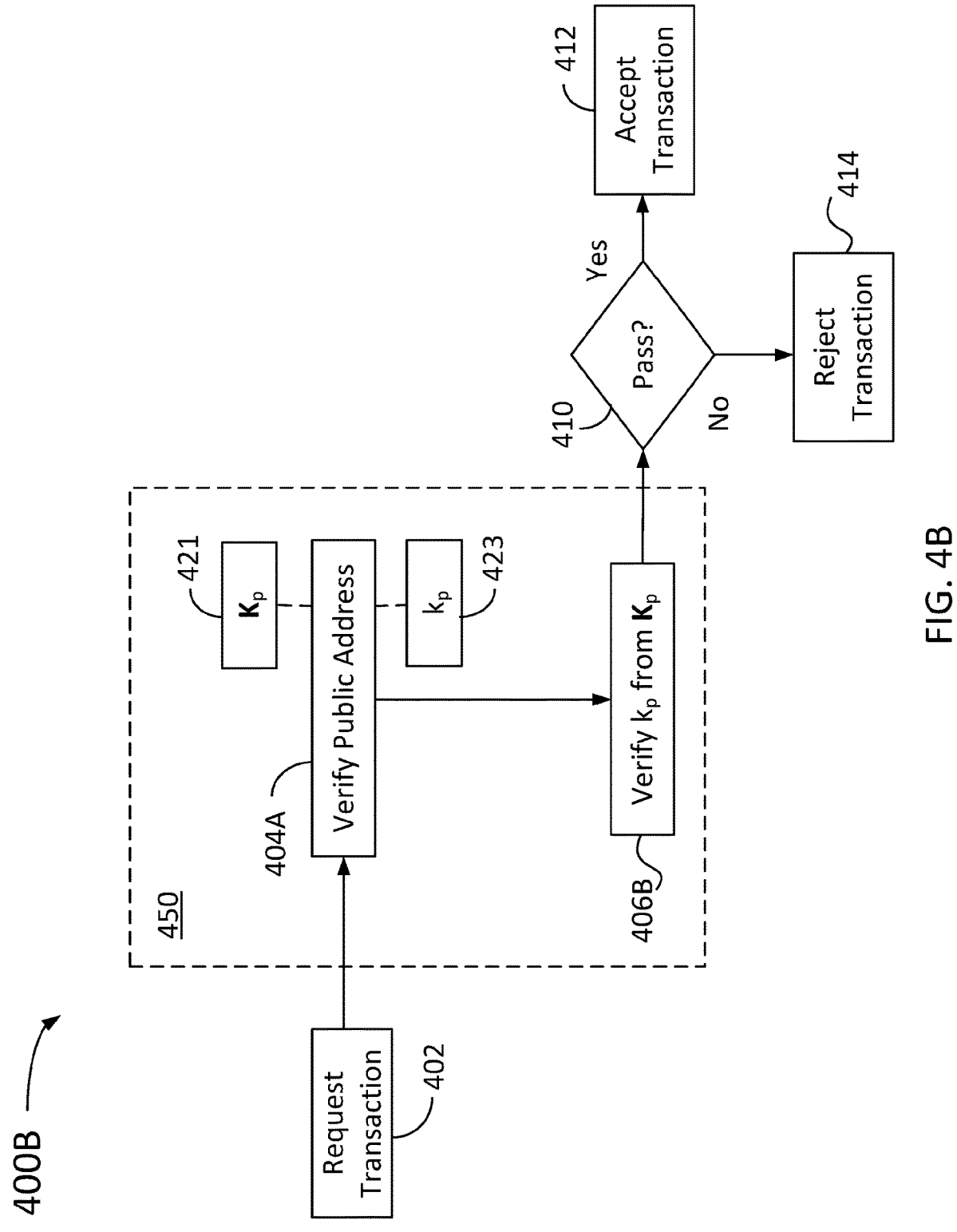
Figure 4C:
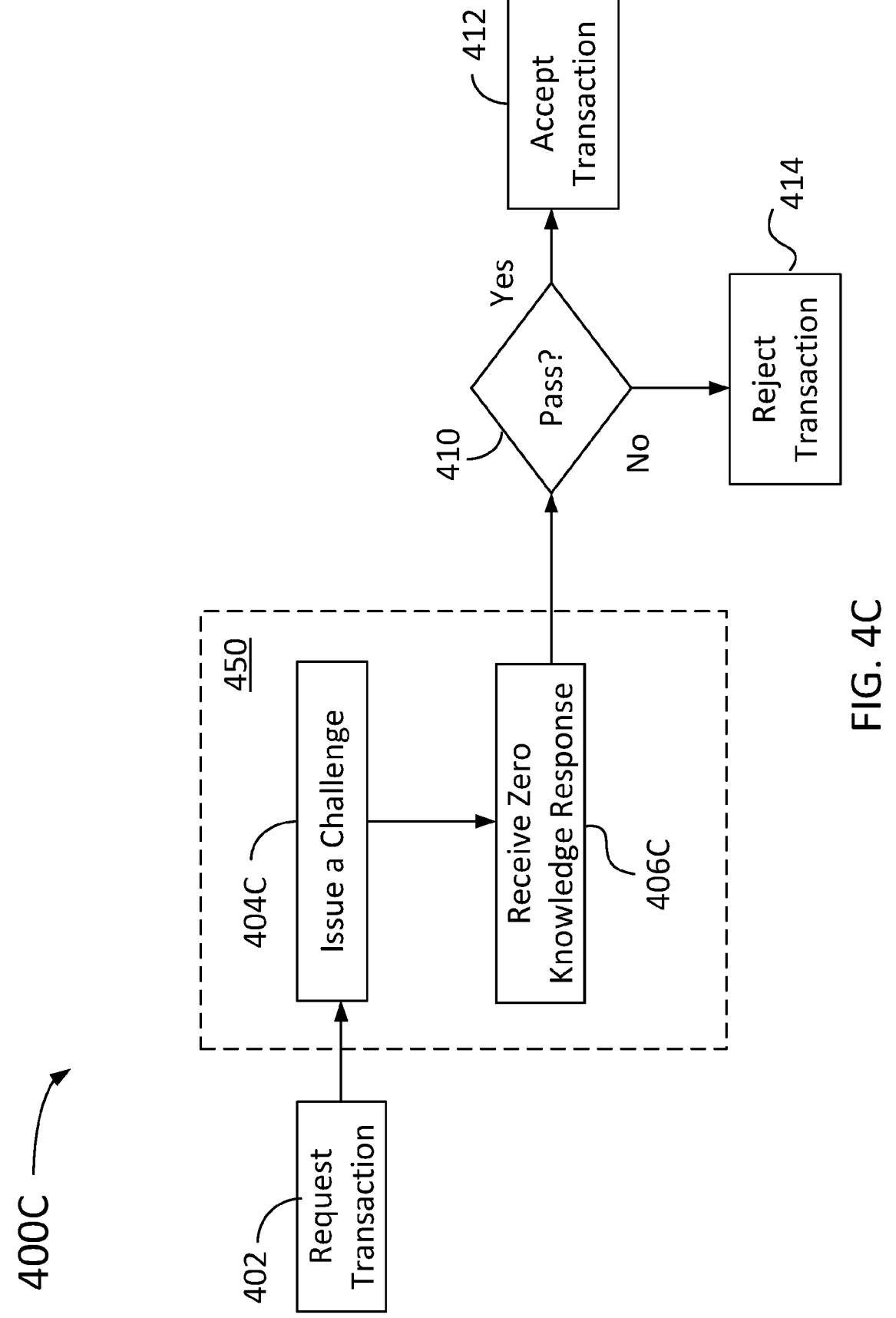

FIGS. 4A-4C illustrate exemplary flow diagrams 400A, 400B, and 400C (hereinafter, collectively referred to as "flow diagrams 400"), for verifying non-transferable tokens, as disclosed herein. In some embodiments, one or more of the steps in flow diagrams 400 may be performed by a processor executing instructions from a memory in one of the servers or client devices hosting a blockchain network as disclosed herein. Moreover, in some embodiments, one or more of the steps in flow diagrams 400 may be performed in a different order, simultaneously, quasi-simultaneously, or overlapping in time.

Flow diagrams 400 start with a request for a transaction 402 in the blockchain, from a user. After a verification blocks 450A, 450B and 450C (hereinafter, collectively referred to as "verification blocks 450"), the blockchain determines in step 410 whether the transaction request is valid and passes verification blocks 450. When the answer is "Yes," step 412 includes accepting the transaction. And when the answer is "No," step 414 includes rejecting the transaction.

In a signed challenge flow 400A, verification block 450A includes step 404A for verifying a public address of the NTT holder using the public key 421 ($K_p$). Step 406A includes issuing, by the blockchain, a challenge to the NTT holder. The NTT holder signs the challenge with a private key 423 ($k_p$). And step 408A includes receiving the signature for verification before continuing with step 410.

In a transaction flow 400B (e.g., a smart contract), the blockchain has already verified the public address (step 404A), and knows whether the NTT holder has possession of private key 423 (kp), or not. Then the flow continues with step 410.

In a zero knowledge flow 400C, for verification block 450C the blockchain issues a challenge in step 4004C. The user provides a zero knowledge response in step 406C, and then the flow continues to step 410. A zero knowledge response is a response to the challenge that does not reveal the public-private key pair 421/423, but it still provides an answer to the challenge that the blockchain can verify.

FIG. 5 illustrates an example flow diagram (e.g., process 500) for generating a non-transferable blockchain security credential via a computing platform, according to certain aspects of the disclosure. For explanatory purposes, the example process 500 is described herein with reference to one or more of the figures above. Further for explanatory purposes, the blocks of the example process 500 are described herein as occurring in serial, or linearly. However, multiple instances of the example process 500 may occur in parallel, overlapping in time, almost simultaneously, or in a different order from the order illustrated in the process 500. In addition, the blocks of the example process 500 need not be performed in the order shown and/or one or more of the blocks of the example process 500 need not be performed.

At step 502, a request for execution of a program stored on a blockchain may be received. At step 504, a party that originated the request may be identified. According to an aspect, identifying the party comprises determining that the party possesses the non-transferable credential and the non-transferable credential is classified under a category of non-unique credential. At step 506, an issuer of a non-transferable credential stored on the blockchain may be selected. According to an aspect, selecting an issuer of a non-transferable credential comprises storing the non-transferable credential as a non-movable credential granted to a public address on the blockchain. At step 508, receipt of the non-transferable credential from the party may be requested. According to an aspect, requesting receipt of the non-transferable credential from the party comprises receiving attribute value pairs indicative of the party possessing a private key corresponding to non-transferable credential. At step 510, a credential check may be performed based on a digitally signed statement pertaining to ownership of the non-transferable credential. For example, the digitally signed statement comprises the attribute value pairs. According to an aspect, performing a credential check comprises receiving a zero-knowledge proof from the party.

According to an aspect, the process 500 may further include determining, by the issuer of the non-transferable credential, an expiration time for the non-transferable credential. According to an aspect, the process 500 may further include determining, by the issuer of the non-transferable credential, performing a revocation of a key set of the non-transferable credential. According to an aspect, the process 500 may further include capturing, via a crypto signature, a quorum attestation that the party possesses the non-transferable credential. The process 500 may include generating, for the party, a proof of ownership of the non-transferable credential based on the quorum attestation. According to an aspect, the process 500 may further include determining a parameter of the non-transferable credential, wherein an encryption of the non-transferable credential on the blockchain is decryptable by a key corresponding to the party. The process 500 may include receiving an image representation that indicates a characteristic of the non-transferable credential.

Figure 6:
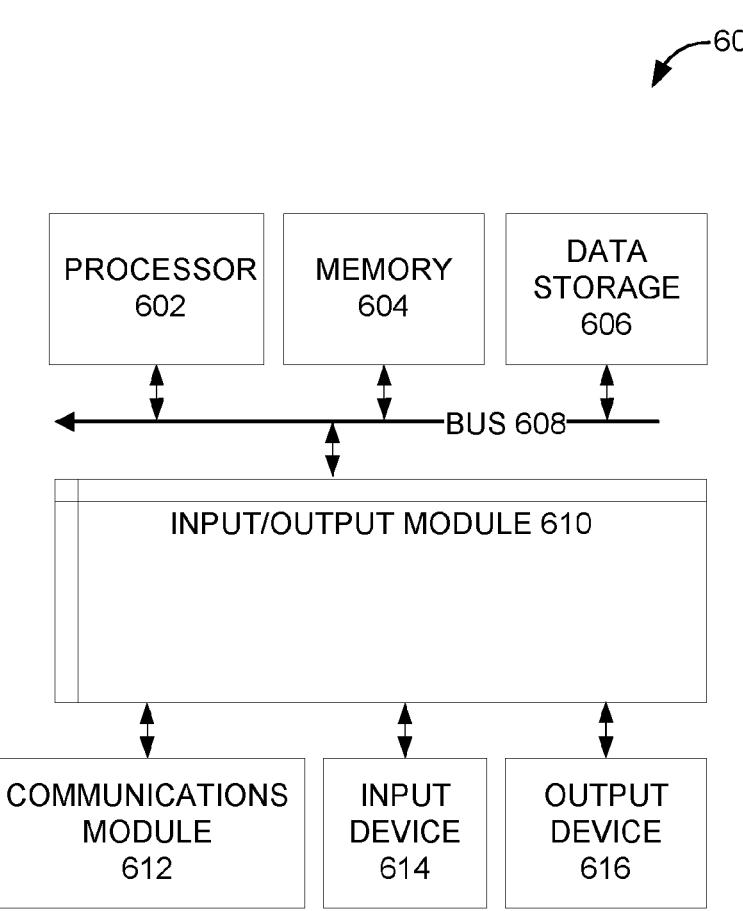
FIG. 6 is a block diagram illustrating an example computer system in which aspects of the present disclosure can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

The computer system 600 (e.g., server and/or client) includes a bus 608 or other communication mechanism for communicating information, and a processor 602 coupled with the bus 608 for processing information. By way of example, the computer system 600 may be implemented with one or more processors 602. Each of the one or more processors 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by the processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 600 further includes a data storage device 606 such as a magnetic disk or optical disk, coupled to bus 608 for storing information and instructions. The computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described systems can be implemented using a computer system 600 in response to the processor 602 executing one or more sequences of one or more instructions contained in the memory 604. Such instructions may be read into memory 604 from another machine-readable medium, such as data storage device 606. Execution of the sequences of instructions contained in the main memory 604 causes the processor 602 to perform the process steps described herein. One or more processors in a multi-processing arrangement may also be employed to execute the sequences of instructions contained in the memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 600 can include clients and servers. A client and server are generally remote from each other and typically interact through a communication network. The relationship of client and server arises by virtue of computer programs running on the respective computers and having a client-server relationship to each other. The computer system 600 can be, for example, and without limitation, a desktop computer, laptop computer, or tablet computer. The computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 602 for execution. Such a medium may take many forms, including, but not limited to, non-volatile media, volatile media, and transmission media. Non-volatile media include, for example, optical or magnetic disks, such as the data storage device 606. Volatile media include dynamic memory, such as the memory 604. Transmission media include coaxial cables, copper wire, and fiber optics, including the wires that comprise the bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving a request for execution of a transaction in a blockchain;
identifying an originating party that submitted the request;
selecting, based on issuer permissions indicated by credential classes stored on the blockchain, an issuer authorized to issue a non-transferable credential associated with the originating party;
determining a parameter of the non-transferable credential, wherein determining the parameter comprises determining a limited quantity of moves of the non-transferable credential that are permitted;
performing a credential check based on a digitally signed statement associated with a credential class of the selected issuer, the credential check (i) pertaining to ownership of the non-transferable credential and (ii) confirming that the non-transferable credential has not been revoked and remains bound to the originating party;

based on successful completion of the credential check, executing the transaction; and based on failure of the credential check, rejecting the transaction request and preventing inclusion of the transaction in the blockchain.

2. The computer-implemented method of claim 1, wherein identifying the originating party comprises determining that the originating party possesses the non-transferable credential and the nontransferable credential is classified under a category of non-unique credentials.

3. The computer-implemented method of claim 1, wherein selecting an issuer of a non-transferable credential comprises storing the non-transferable credential as a non-movable credential granted to a public address on the blockchain.

4. The computer-implemented method of claim 1, wherein requesting receipt of the non-transferable credential from the originating party comprises receiving attribute value pairs indicative of the originating party possessing a private key corresponding to the non-transferable credential, wherein the digitally signed statement comprises the attribute value pairs.

5. The computer-implemented method of claim 1, wherein performing a credential check comprises receiving a zero-knowledge proof from the originating party.

6. The computer-implemented method of claim 1, further comprising determining, by the issuer of the non-transferable credential, an expiration time for the non-transferable credential.

7. The computer-implemented method of claim 1, further comprising performing, by the issuer of the non-transferable credential, a revocation of a key set of the nontransferable credential.

8. The computer-implemented method of claim 1, further comprising:

capturing, via a crypto signature, a quorum attestation that the originating party possesses the non-transferable credential; and generating, for the originating party, a proof of ownership of the non-transferable credential based on the quorum attestation.

9. The computer-implemented method of claim 1, further comprising:

determining an encryption parameter of the non-transferable credential, the encryption parameter specifying that the non-transferable credential is encrypted on the blockchain and is decryptable by a key corresponding to the originating party.

10. A system, comprising:

one or more processors; and a memory comprising instructions stored thereon, which when executed by the one or more processors, causes the one or more processors to perform:

receiving a request for execution of a transaction in a blockchain;

identifying an originating party that submitted the request;

selecting, based on issuer permissions indicated by credential classes stored on the blockchain, an issuer authorized to issue a non-transferable credential associated with the originating party;

determining a parameter of the non-transferable credential, wherein determining the parameter comprises determining a limited quantity of moves of the non-transferable credential that are permitted;

requesting receipt of the non-transferable credential from the originating party; and performing a credential check based on a digitally signed statement associated with a credential class of the selected issuer, the credential check (i) pertaining to ownership of the non-transferable credential and (ii) confirming that the non-transferable credential has not been revoked and remains bound to the originating party;

based on successful completion of the credential check, executing the transaction; and based on failure of the credential check, rejecting the transaction request and preventing inclusion of the transaction in the blockchain.

11. The system of claim 10, wherein the instructions that cause the one or more processors to identify the originating party that originated the request, cause the one or more processors to perform determining that the originating party possesses the non-transferable credential and the non-transferable credential is classified under a category of non-unique credentials.

12. The system of claim 10, wherein the instructions that cause the one or more processors to perform selecting an issuer of a non-transferable credential cause the one or more processors to perform storing the non-transferable credential as a non-movable credential granted to a public address on the blockchain.

13. The system of claim 10, wherein the instructions that cause the one or more processors to perform requesting receipt of the non-transferable credential from the originating party that originated the request, cause the one or more processors to perform receiving attribute value pairs indicative of the originating party possessing a private key corresponding to the non-transferable credential, wherein the digitally signed statement comprises the attribute value pairs.

14. The system of claim 10, wherein the instructions that cause the one or more processors to perform performing a credential check cause the one or more processors to perform receiving a zero-knowledge proof from the originating party.

15. The system of claim 10, further comprising stored sequences of instructions, which when executed by the one or more processors, cause the one or more processors to perform determining, by the issuer of the non-transferable credential, an expiration time for the nontransferable credential.

16. The system of claim 10, further comprising stored sequences of instructions, which when executed by the one or more processors, cause the one or more processors to perform, by the issuer of the non-transferable credential, a revocation of a key set of the non-transferable credential.

17. The system of claim 10, further comprising stored sequences of instructions, which when executed by the one or more processors, cause the one or more processors to perform:

capturing, via a crypto signature, a quorum attestation that the originating party possesses the non-transferable credential; and generating, for the originating party, a proof of ownership of the non-transferable credential based on the quorum attestation.

18. The system of claim 10, further comprising stored sequences of instructions, which when executed by the one or more processors, cause the one or more processors to perform:

determining an encryption parameter of the non-transferable credential, the encryption parameter specifying that the non-transferable credential is encrypted on the blockchain and is decryptable by a key corresponding to the originating party; and receiving an image representation that indicates a characteristic of the non-transferable credential.

19. A non-transitory computer-readable storage medium comprising instructions stored thereon, which when executed by one or more processors, cause the one or more processors to perform operations, comprising:

receiving a request for execution of a transaction on a blockchain;

identifying an originating party that submitted the request;

selecting, based on issuer permissions indicated by credential classes stored on the blockchain, an issuer authorized to issue a non-transferable credential associated with the originating party;

determining a parameter of the non-transferable credential, wherein determining the parameter comprises determining a limited quantity of moves of the non-transferable credential that are permitted;

requesting receipt of the non-transferable credential from the originating party;

receiving an image representation that indicates a characteristic of the non-transferable credential;

performing a credential check based on a digitally signed statement associated with a credential class of the selected issuer, the credential check (i) pertaining to ownership of the non-transferable credential and (ii) confirming that the non-transferable credential has not been revoked and remains bound to the originating party;

based on successful completion of the credential check, executing the transaction; and based on failure of the credential check, rejecting the transaction request and preventing inclusion of the transaction in the blockchain.

20. The computer-implemented method of claim 1, further comprising:

receiving an image representation that indicates a characteristic of the non-transferable credential.

* * * * *